United States Patent
You et al.

(10) Patent No.: US 11,094,105 B2
(45) Date of Patent: Aug. 17, 2021

(54) DISPLAY APPARATUS AND CONTROL METHOD THEREOF

(71) Applicant: SAMSUNG ELECTRONICS CO., LTD., Suwon-si (KR)

(72) Inventors: Jae-young You, Hwaseong-si (KR); Jeong-rok Jang, Suwon-si (KR); Kwan-sik Yang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 6 days.

(21) Appl. No.: 15/843,129

(22) Filed: Dec. 15, 2017

(65) Prior Publication Data
US 2018/0174356 A1    Jun. 21, 2018

(30) Foreign Application Priority Data
Dec. 16, 2016 (KR) .................. 10-2016-0172839

(51) Int. Cl.
*G06T 15/20* (2011.01)
*G06F 3/08* (2006.01)
(Continued)

(52) U.S. Cl.
CPC ............ *G06T 15/20* (2013.01); *G06F 3/0482* (2013.01); *G06F 3/04815* (2013.01); *G11B 27/34* (2013.01); *H04N 21/8146* (2013.01); *G06F 3/04842* (2013.01); *G06F 2203/04802* (2013.01); *G06T 2200/24* (2013.01); *G06T 2215/16* (2013.01)

(58) Field of Classification Search
CPC . G06T 15/20; G06T 2215/16; G06T 2200/24; G11B 27/34; G06F 3/04815; G06F 3/0482; G06F 3/04842; H04N 5/23229; H04N 21/6587; H04N 5/772; H04N 5/23206; H04N 5/2258
See application file for complete search history.

(56) References Cited

U.S. PATENT DOCUMENTS 6,529,206 B1 * 3/2003 Ohki ................. G06T 15/20
345/427
2002/0024599 A1    2/2002 Fukuhara et al.
(Continued)

FOREIGN PATENT DOCUMENTS

| CN | 101999139 A | 3/2011 |
|----|-------------|--------|
| CN | 203164590 U | 8/2013 |

(Continued)

OTHER PUBLICATIONS

Communication dated May 11, 2018, issued by the European Patent Office in counterpart European application No. 17207243.1.
(Continued)

*Primary Examiner* — Saptarshi Mazumder
(74) *Attorney, Agent, or Firm* — Sughrue Mion, PLLC

(57) ABSTRACT

A display apparatus and a control method thereof are provided. The display apparatus includes a receiver configured to receive a command, a processor configured to receive a content image and generate a three dimensional (3D) image by mapping the content image to a 3D structure selected from a plurality of 3D structures, each having different geometrical forms, and a display configured to display one viewpoint of the 3D image according to the command.

20 Claims, 28 Drawing Sheets

(51) Int. Cl.
*G06F 3/0481* (2013.01)
*G11B 27/34* (2006.01)
*H04N 21/81* (2011.01)
*G06F 3/0482* (2013.01)
*G06F 3/0484* (2013.01)

(56) References Cited

U.S. PATENT DOCUMENTS

| | | | |
|---|---|---|---|
| 2004/0104935 | A1 | 6/2004 | Williamson et al. |
| 2010/0115455 | A1* | 5/2010 | Kim .................. G06F 3/04815 715/781 |
| 2010/0239122 | A1 | 9/2010 | Busch et al. |
| 2012/0082339 | A1* | 4/2012 | Sakai ................. H04L 12/1827 382/103 |
| 2013/0231184 | A1 | 9/2013 | Hatanaka |
| 2014/0232821 | A1 | 8/2014 | Chamaret et al. |
| 2014/0286619 | A1 | 9/2014 | Nakagome et al. |
| 2015/0220225 | A1* | 8/2015 | Jiang .................... G06F 3/0482 705/26.8 |
| 2015/0325055 | A1 | 11/2015 | Balakrishna et al. |
| 2016/0012855 | A1 | 1/2016 | Krishnan |
| 2016/0132991 | A1* | 5/2016 | Fukushi ............. A63F 13/5255 345/667 |
| 2016/0189380 | A1 | 6/2016 | Li et al. |
| 2017/0064374 | A1* | 3/2017 | Eim .................... G06F 3/04817 |
| 2018/0084197 | A1* | 3/2018 | Lee ..................... H04N 5/23293 |
| 2018/0124310 | A1* | 5/2018 | Taneichi ............. H04N 5/23229 |

FOREIGN PATENT DOCUMENTS

| | | |
|---|---|---|
| CN | 103582900 A | 2/2014 |
| CN | 104065875 A | 9/2014 |
| CN | 105389787 A | 3/2016 |
| CN | 105701766 A | 6/2016 |
| CN | 105791795 A | 7/2016 |
| EP | 1 487 205 A1 | 12/2004 |
| KR | 10-2011-0048892 A | 5/2011 |
| WO | 97/42601 A1 | 11/1997 |
| WO | 01/89221 A1 | 11/2001 |

OTHER PUBLICATIONS

Communication dated Jul. 1, 2020, from The China National Intellectual Property Administration in Application No. 201711350668.9.

Communication dated Mar. 12, 2021 issued by the European Intellectual Property Office in counterpart European Application No. 17 207 243.1.

* cited by examiner

DISPLAY APPARATUS AND CONTROL METHOD THEREOF

CROSS-REFERENCE TO RELATED APPLICATION

This application claims priority from Korean Patent Application No. 10-2016-0172839, filed on Dec. 16, 2016 in the Korean Intellectual Property Office, the disclosure of which is incorporated herein in its entirety by reference.

BACKGROUND

1. Field

Apparatuses and methods consistent with exemplary embodiments relate to a display apparatus and a control method thereof, and more particularly to a display apparatus, which displays an image having a three dimensional (3D) structure, and a control method thereof.

2. Description of the Related Art

Recently, a display apparatus may provide various images, including a 360 degree/virtual reality (VR) image. If a 3D image generated capturing an image with several cameras or a camera having a plurality of lenses mounted thereon and mapping the captured image to a 3D structure is provided for a user, the user may appreciate the 3D image while moving a viewpoint thereover. In effect, the user feels like as if she or he is in a real space A related art display apparatus has mapped the 360 degree/VR image only to a fixed 3D structure to show the user it. In other words, the user could watch an image of 360 degree/VR content only in the form of a preset 3D structure. Since a representation form of the 360 degree/VR image provided by the related art display apparatus is simple and fixed, user's experience and interest is limited.

On the other hand, even with respect to the 360 degree/VR content, a thumbnail image, which represents information of the 360 degree/VR content, may be provided. However, if the thumbnail image is provided by simply scaling or cutting off an image of 360 degree/VR content, it is difficult for the user to know the corresponding 360 degree/VR content due to distorted representation of the thumbnail image. Further, in this case, user's experience and interest due to the simple representation form of the thumbnail image is limited.

SUMMARY

Exemplary embodiments address at least the above problems and/or disadvantages and other disadvantages not described above. Also, the exemplary embodiments are not required to overcome the disadvantages described above, and may not overcome any of the problems described above.

The exemplary embodiments may provide a display apparatus, which may display a 360 degree/virtual reality (VR) image in the form of a 3D structure as desired by a user, and a control method thereof.

Further, the exemplary embodiments may provide a display apparatus, which displays a thumbnail image capable of allowing the user to easily know that it corresponds to a 360 degree/VR content and representing the corresponding 360 degree/VR content without distortion, and a control method thereof.

Also, the exemplary embodiments may provide a display apparatus, which may display a thumbnail image of a 360 degree/VR content in various ways, thereby providing more enhanced experience and interest for a user.

According to an aspect of an exemplary embodiment, there is provided a display apparatus comprising: a receiver configured to receive a command; a processor configured to: receive a content image; and generate a three dimensional (3D) image by mapping the content image to a 3D structure selected from a plurality of 3D structures, each having different geometrical forms, and a display configured to display one viewpoint of the 3D image according to the command.

The processor may be further configured to generate a thumbnail image for a content of the content image using a portion of the content image, and display a graphic user interface (GUI) including the thumbnail image on the display.

The processor may be further configured to generate the thumbnail image by mapping a region of the content image, in a predetermined width from a reference axis of the content image, to the 3D structure selected from among a plurality of 3D structures.

The processor may be further configured to: map the content image to each of the plurality of 3D structures having different forms to generate a plurality of 3D images corresponding to the content image, and generate a plurality of thumbnail images each corresponding to one viewpoint of each of the plurality of 3D images.

The processor may be further configured to control the display to display at least one thumbnail image among the plurality of thumbnail images to be distinguished from other thumbnail images.

The processor may be further configured to control the display to display the at least one thumbnail image among the plurality of thumbnail images to be distinguished from the other thumbnail images, based on an attribute of the content of the content image.

The processor may be configured to control the display to display a first thumbnail image of a first 3D structure among the plurality of 3D structures with respect to a content of the content image, and change the first thumbnail image of the first 3D structure into a second thumbnail image of a second 3D structure among the plurality of 3D structures in response to a selection of the second 3D structure, and control the display to display the second thumbnail image.

The processor may be further configured to change a size of the thumbnail image to generate a changed thumbnail image and control the display to display the changed thumbnail image.

The processor may be further configured to change a 3D structure corresponding to the thumbnail image to generate a changed thumbnail image and control the display to display the changed thumbnail image.

The command may comprise a user input to select the viewpoint of the 3D image.

According to another aspect of an exemplary embodiment, there is provided a control method of a display apparatus comprising: receiving a content image; generating a three dimensional (3D) image by mapping the content image to a 3D structure selected from a plurality of 3D structures, each having different geometrical forms, and displaying one viewpoint of the 3D image on a display according to a received command.

The method may further comprise generating a thumbnail image for a content of the content image using a portion of the content image, and displaying the thumbnail image on the display.

The generating the thumbnail image may comprise mapping a region, in a predetermined width from a reference axis of the content image, to the 3D structure.

The generating the thumbnail image may comprises: mapping the content image to each of the plurality of 3D structures having different forms to generate a plurality of 3D image corresponding to the content image; and generating a plurality of thumbnail images each corresponding to one viewpoint of each of the plurality of 3D image.

The generating the thumbnail image may comprise distinguishing at least one thumbnail image among the plurality of thumbnail images from other thumbnail images.

The distinguishing may comprise distinguishing the at least one thumbnail image among the plurality of thumbnail images from the other thumbnail images, based on an attribute of the content of the content image.

The method may further comprise displaying a first thumbnail image of a first 3D structure among the plurality of 3D structures with respect to a content of the content image, and changing the first thumbnail image of the first 3D structure into a second thumbnail image of a second 3D structure among the plurality of 3D structures in response to a selection of the second 3D structure, and displaying the second thumbnail image on the display.

The method may further comprise changing a size of the thumbnail image to generate a changed thumbnail image and displaying the changed thumbnail image.

The method may further comprise changing a 3D structure corresponding to the thumbnail image to generate a changed thumbnail image and displaying the changed thumbnail image.

The received command may comprise a user input to select the viewpoint of the 3D image.

According to another aspect of an exemplary embodiment, there is provided a non-transitory computer readable medium including a computer program for executing the control method comprising receiving a content image; generating a three dimensional (3D) image by mapping the content image to a 3D structure selected from a plurality of 3D structures, each having different geometrical forms, and displaying one viewpoint of the 3D image on a display according to a received command.

According to another aspect of an exemplary embodiment, there is provided a display apparatus comprising: a processor configured to receive a content image for which a thumbnail image is to be generated; determine an axis in the content image based on a geometrical distortion in the content image; extract a region based on the axis and based on the geometrical distortion in the content image; and generate the thumbnail image based on the extracted region.

The processor may be further configured to: determine a first area from the axis in a first direction; determine a second area from the axis in a second direction, which is opposite to the first direction; and determine a combination of the first area and the second area as the extracted region.

The processor may be further configured to: generate a three dimensional (3D) image by mapping the thumbnail image to a 3D structure selected from a plurality of 3D structures, each having different geometrical forms, and control a display to display the 3D image.

The processor may be further configured to map the thumbnail image to the 3D structure by: extracting a plurality of regions from the thumbnail image; and mapping each of the plurality of regions to a separate viewpoint of the 3D structure to generate a plurality of viewpoints of the 3D image.

According to another aspect of an exemplary embodiment, there is provided a method of display apparatus comprising: receiving a content image for which a thumbnail image is to be generated; determining an axis in the content image based on a geometrical distortion in the content image; extracting a region based on the axis and based on the geometrical distortion in the content image; and generating the thumbnail image based on the extracted region.

The extracting the region may further comprise: determining a first area from the axis in a first direction; determining a second area from the axis in a second direction, which is opposite to the first direction; and determining a combination of the first area and the second area as the extracted region.

The method may further comprising: generating a three dimensional (3D) image by mapping the thumbnail image to a 3D structure selected from a plurality of 3D structures, each having different geometrical forms, and controlling a display to display the 3D image.

The mapping the thumbnail image to the 3D structure may comprise: extracting a plurality of regions from the thumbnail image; and mapping each of the plurality of regions to a separate viewpoint of the 3D structure to generate a plurality of viewpoints of the 3D image.

BRIEF DESCRIPTION OF THE DRAWINGS

The above and other aspects, features, and advantages of certain exemplary embodiments of the present disclosure will be more apparent from the following description taken in conjunction with the accompanying drawings, in which.

DETAILED DESCRIPTION OF EXEMPLARY EMBODIMENTS

Figure 1:
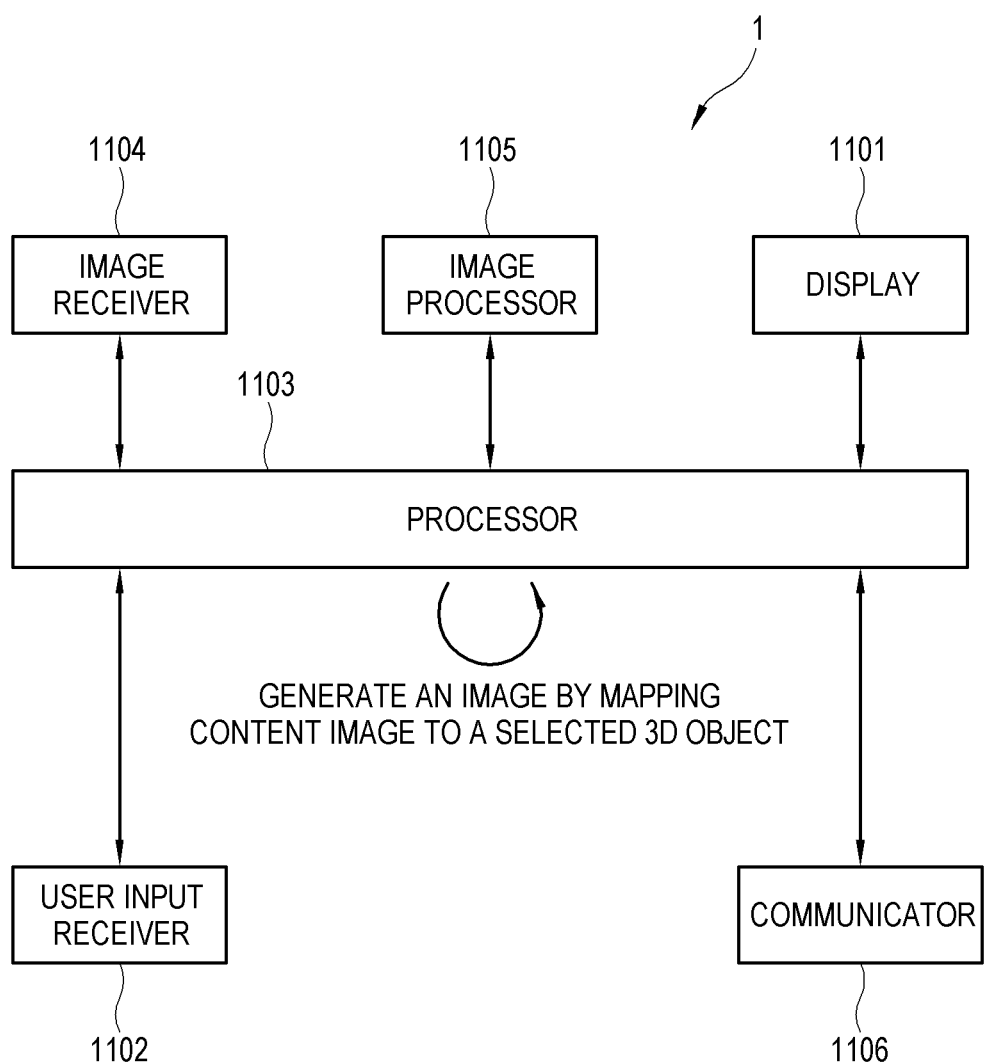
FIG. 1 is a block diagram illustrating a configuration of a display apparatus according to an exemplary embodiment.

Hereinafter, exemplary embodiments will be described in detail with reference to accompanying drawings. Exemplary features shown in the accompanying drawings are referred to in the following descriptions of the exemplary embodiments and for clarity, like reference numerals or symbols presented in respective drawings denote like elements, which substantially perform the same functions.

FIG. 1 is a block diagram illustrating a configuration of a display apparatus according to an exemplary embodiment. The display apparatus 1 as illustrated in FIG. 1 may be implemented as, for example, a television (TV). In other exemplary embodiments, the display apparatus 1 may be implemented as a smart phone, a tablet personal computer (PC), a mobile phone, a computer, a multimedia reproducing device, an electronic picture frame, a digital advertising board, a large format display (LFD), a signage, a set-top box, a smart watch, a wearable device such as a head-mounted display (HMD), a smart home appliance, such as a smart refrigerator, etc. However, the present disclosure is not limited thereto and may be applied to any apparatus capable of displaying an image of content and a graphic user interface (GUI).

The display apparatus 1 according to an exemplary embodiment displays an image of a content (hereinafter, referred as a 'content image') to make a user feel as if the user looks around in a space. The display apparatus 1 may display, for example, an image of 360 degree/virtual reality content. In other words, the display apparatus 1 maps the content image to a three dimensional (3D) structure and displays an image corresponding to one viewpoint of the mapped 3D image. The content displayed by the display apparatus 1 according to an exemplary embodiment is not limited to the 360 degree/virtual reality content and may include various representation types of contents, which make the user feel like the user is in the space. Also, to provide information on the content for the user, the display apparatus 1 may display a thumbnail image, which represents the content image. In this case, the display apparatus 1 may display the thumbnail image in the form of a GUI.

As illustrated in FIG. 1, the display apparatus 1 includes a display 1101, a user input receiver 1102, and a processor 1103. Also, the display apparatus 1 may further include at least one of an image receiver 1104, an image processor 1105 and a communicator 1106. The configuration of the display apparatus 1 according to an exemplary embodiment is merely an example and may be implemented in configurations other than that illustrated in FIG. 1. In other words, the display apparatus according to an exemplary embodiment may be implemented as including additional elements other than those illustrated in FIG. 1 or removing any one from among elements illustrated in FIG. 1. In the exemplary embodiment, each element of the display apparatus 1 may be implemented as at least one hardware or/and software and also as at least one circuit or chip.

According to an exemplary embodiment, the image receiver 1104 may receive an image signal including the content image. The image signal may be received in the form of a broadcast signal. In this case, the image receiver 1104 may be provided with a tuner for receiving the broadcast signal. Under control of the processor 1103, the tuner may tune a broadcast signal of any one channel selected by the user from among a plurality of channels. The image receiver 1104 may receive the image signal from an image processing apparatus, such as a set-top box, a digital versatile disc (DVD) player, and a PC, a mobile apparatus, such as a smart phone, or a server via an internet.

According to an exemplary embodiment, the processor 1103 may control the image processor 1105 to extract the content image from the image signal received from the image receiver 1104 and perform an image processing with respect to the content image to display a corresponding image on the display 1101. Further, the image processor 1105 may perform an image processing for generating the thumbnail image of the content according to the control of the processor 1103. Also, the image processor 1105 may perform an image processing for generating a GUI on the content image and/or the thumbnail image according to the control of the processor 1103. The image processor 1105 may be implemented as at least one hardware and/or software module, and a combination thereof.

According to an exemplary embodiment, the display 1101 may display the content image and/or the thumbnail image, and the GUI thereon, which are processed by the image processor 1105. Implemented types of the display 1101 are not limited, and the display 1101 may be implemented in various types, such as liquid crystal, plasma, light emitting diodes (LED), organic light emitting diodes (OLED), surface-conduction electron-emitter, carbon nano-tube, nano-crystal display, etc. If the display 1101 is the liquid crystal type, the display 1101 includes a liquid crystal display (LCD) panel, a backlight unit to supply light to the LCD panel, a panel driving board to drive the LCD panel, and so on. The display 1101 may be also implemented as an OLED panel, which is a spontaneous emission panel, without the backlight unit.

According to an exemplary embodiment, the user input receiver 1102 may receive a user input to transmit to the processor 1103. The user input receiver 1102 may be implemented in many types according to methods of the user input. For example, the user input receiver 1102 may be implemented as a menu button installed on an outer side the display apparatus 1, a remote control signal receiver to receive a remote control signal corresponding to the user input from a remote processor, a touch screen provided on the display 1101 to receive a touch input of user, a camera to sense a gesture input of user, a microphone to recognize a voice input of the user, etc.

According to an exemplary embodiment, the communicator 1106 as an alternatively providable element may communicate with an external apparatus, which provides the image signal. The communicator 1106 is variously implemented according to communication ways with the external apparatus. For example, the communicator 1106 may include a connector for wired communication. The connector may transmit and receive signals/data according to standards, such as high definition multimedia interface (HDMI), HDMI-consumer electronics control (HDMI-CEC), USB, component and so on, and include at least one connecting part or terminal corresponding to the respective standards. The communicator 1106 may be implemented in many other communication ways beside the connector including the connecting part or the terminal for wired communication. For example, to perform wireless communication with the external apparatus, the communicator 1106 may include a radio frequency (RF) circuit for transmitting and receiving a RF signal to communicate by wireless with the external apparatus, and may be configured to communicate using one or more protocol from among wireless fidelity (Wi-Fi), Bluetooth (BT), Zigbee, ultra-wide band (UVM), wireless USB, and near field communication (NFC).

According to an exemplary embodiment, the processor 1103 may control the image receiver 1104 and the image processor 1104 to display the content image, the thumbnail image and/or the GUI on the display 1101, and perform a given operation according the user input received via the user input receiver 1102. The processor 1103 may execute at least one program for controlling to perform operations as described above. The display apparatus 1 may further include a non-volatile memory in which the program is installed, and a volatile memory in which at least one of the installed program is loaded. At least a portion of the memories may be provided in the processor 1103. The program may include a program (or programs) which is implemented in the form of at least one of a BIOS, a device driver, an operating system, a firmware, a platform, and an application program (application). According to an exemplary embodiment, the application program may be installed or stored in advance in the display apparatus 1 in manufacturing, or installed in the display apparatus 1 based data for the application program received from the outside in use. The data for the application program may be downloaded to the display apparatus 1 from an external server, such as, for example, an application market or the like. The processor 1103 may include more than one or two processors. The processor 1103 and the image processor 1104 may be implemented in a body, and one among the processor 1103 and the image processor 1104 may also include at least some function of the other.

Figure 2:
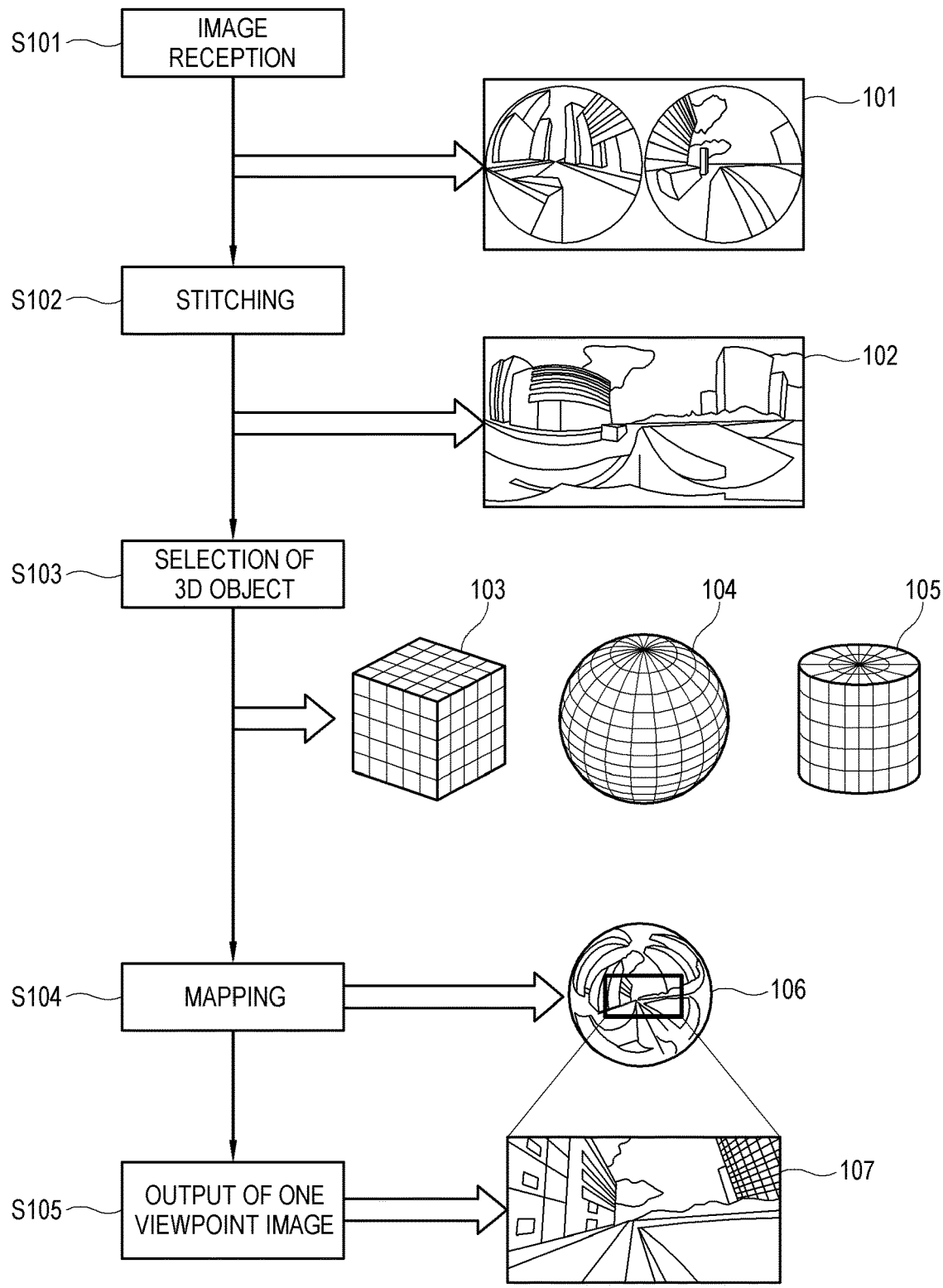
FIG. 2 is a drawing illustrating an operation of the display apparatus according to an exemplary embodiment.

According to an exemplary embodiment, the processor 1103 may control the elements of the display apparatus 1 to display the content image and/or the thumbnail image in various ways. FIG. 2 illustrates a process of displaying the content image or the thumbnail image by the display apparatus 1 according to an exemplary embodiment. First, the image receiver 1104 receives an image signal including a content image 101 (S101). According to an exemplary embodiment, the image receiver 1104 may receive the image signal under control of the processor 1103. The image processor 1105 extracts the content image 101 from the received image signal under the control of the processor 1103. The content image 101 may be composed of a plurality of images, which are obtained using a plurality of cameras or lenses disposed on different bearings from one other, respectively. The cameras or lenses may include a wide angle lens. The content image 101 as illustrated in FIG. 2 is an image, which is obtained using two cameras or lenses, but the present disclosure is not limited thereto.

The content image 101 may be a frame of a point of time, which constitutes a motion image capable of being played for a predetermined time. In this case, the image receiver 1104 may continuously receive a plurality of frames for the motion image in a streaming manner. Also, the image receiver 1104 may receive a frame in full or by one or some segments, each of which is one from among a plurality of segments divided by a predetermined number from the frame.

According to an exemplary embodiment, the image processor 1105 performs a stitching processing, which naturally connects border portions between individual images obtained through the camera or lenses, respectively, with respect to the content image 101 to form a content image 102 (S102). According to another exemplary embodiment, the image receiver 1104 may directly receive a content image 102 in which the stitching processing is already performed or to which the stitching processing is not required. In this case, the image processor 1105 may not perform the stitching processing to the received content image 102.

The processor 1103 may select a 3D structure to which the content image 102 is to be mapped (S103). The processor 1103 may select any one from a plurality of 3D structures 103, 104 and 105. Although the selectable 3D structures 103, 104 and 105 have been illustrated as a cube, a sphere and a cylinder, the present disclosure is not limited thereto and may be applied to various 3D structures, which include a cuboid, a cone, a pyramid, a dodecahedron, other geometrical shapes, etc. The selection of the 3D structures 103, 104 and 105 may be determined by a user input or a predetermined way.

According to an exemplary embodiment, the image processor 1105 maps at least a portion of the content image 102 to the selected 3D structure 104 according to the control of the processor 1103 (S104). Although FIG. 2 illustrates that the content image 102 is mapped to a sphere 104 selected as the 3D structure, the present disclosure is not limited thereto and may be performed to map the content image 102 to at least one 3D structure selected from among various 3D structures. The processor 1103 controls the image processor 1105 to display on the display 1101, an image 107 corresponding to one viewpoint from the 3D image 106 mapped to the sphere (S105). The processor 1103 may change the viewpoint of the image 107 to be displayed according to the user input. Alternatively, the processor 1103 may automatically change the viewpoint of the image 107 to be displayed according to a predetermined method. Accordingly, since the content image may be displayed in the form of various 3D structures, user's experience or interest is enhanced.

On the other hand, besides the content image, the processor 1103 may display mapping the thumbnail image to various 3D structures. In other words, similar to the operation (S103), the processor 1103 selects any one 3D structure to be used in displaying the thumbnail image from a plurality of 3D structures 103, 104 and 105. Similar to the operation (S104), the processor 1103 maps at least a portion of the content image 102 to the selected 3D structure. Similar to the operation (S105), the processor 1103 displays as the thumbnail image on the display 1101, an image of one viewpoint from among the 3D image mapped to the selected 3D structure. Accordingly, since besides the content image, the thumbnail image may be displayed in the form of various 3D structures, the user may more clearly know the content and the user's experience or interest is more enhanced.

Although FIG. 2 illustrates that the process of displaying the content image or the thumbnail image mapped to any one 3D structure selected from among the plurality of 3D structured 103, 104 and 105, the present disclosure is not limited thereto. In other words, the processor 1103 may control the image processor 1105 to generate a plurality of 3D images mapped to the plurality of 3D structures 103, 104 and 105, respectively, and display content images or thumbnail image with respect to the plurality of generated 3D images, respectively.

Figure 3:
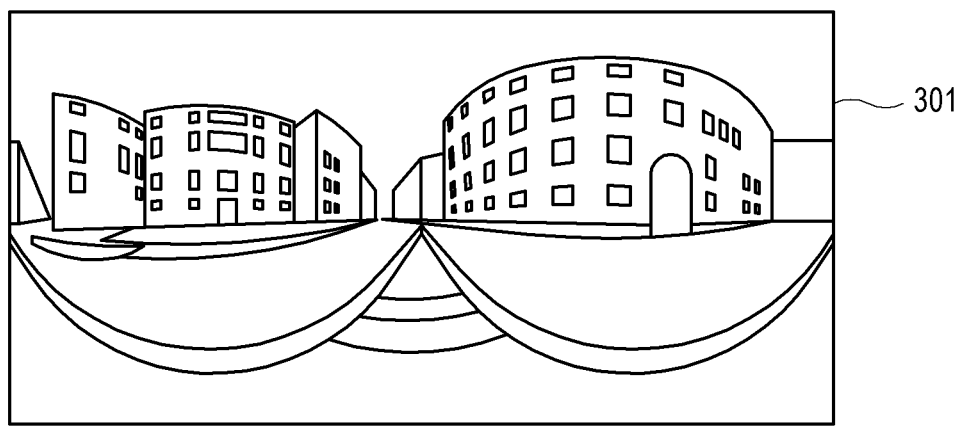
FIGS. 3 and 4 are drawings illustrating examples of a process of generating a thumbnail image in the display apparatus according to an exemplary embodiment.
Figure 3:
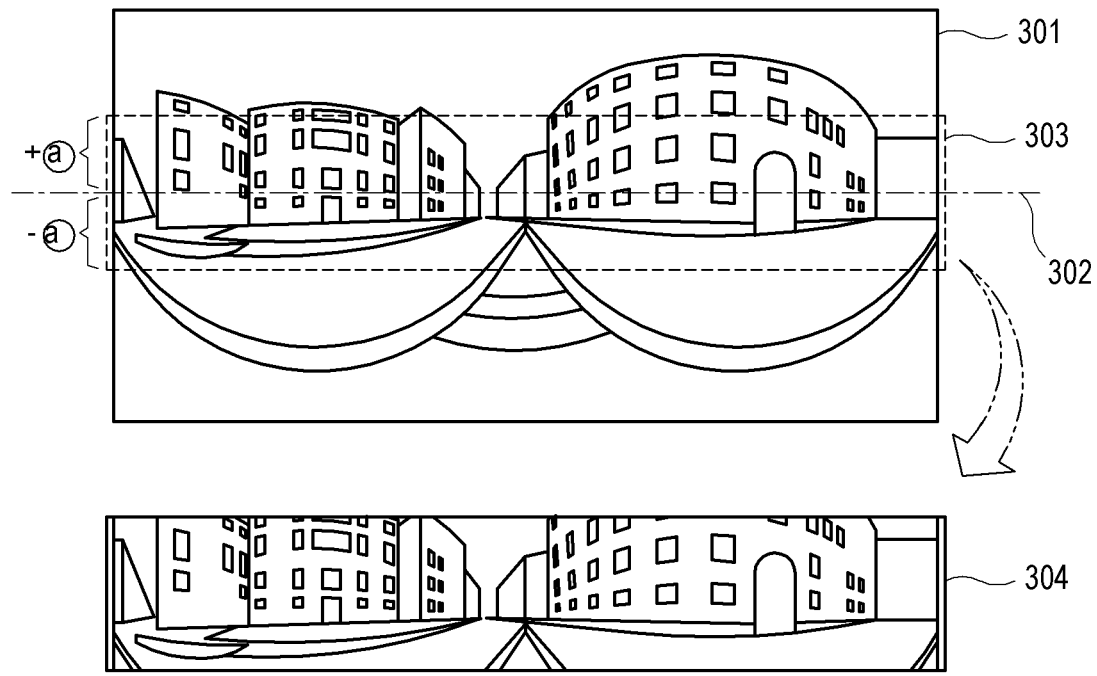
Figure 3:
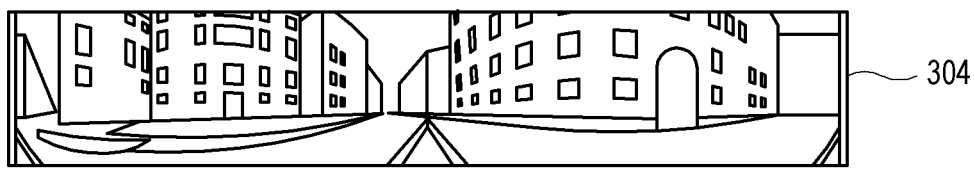
Figure 4:
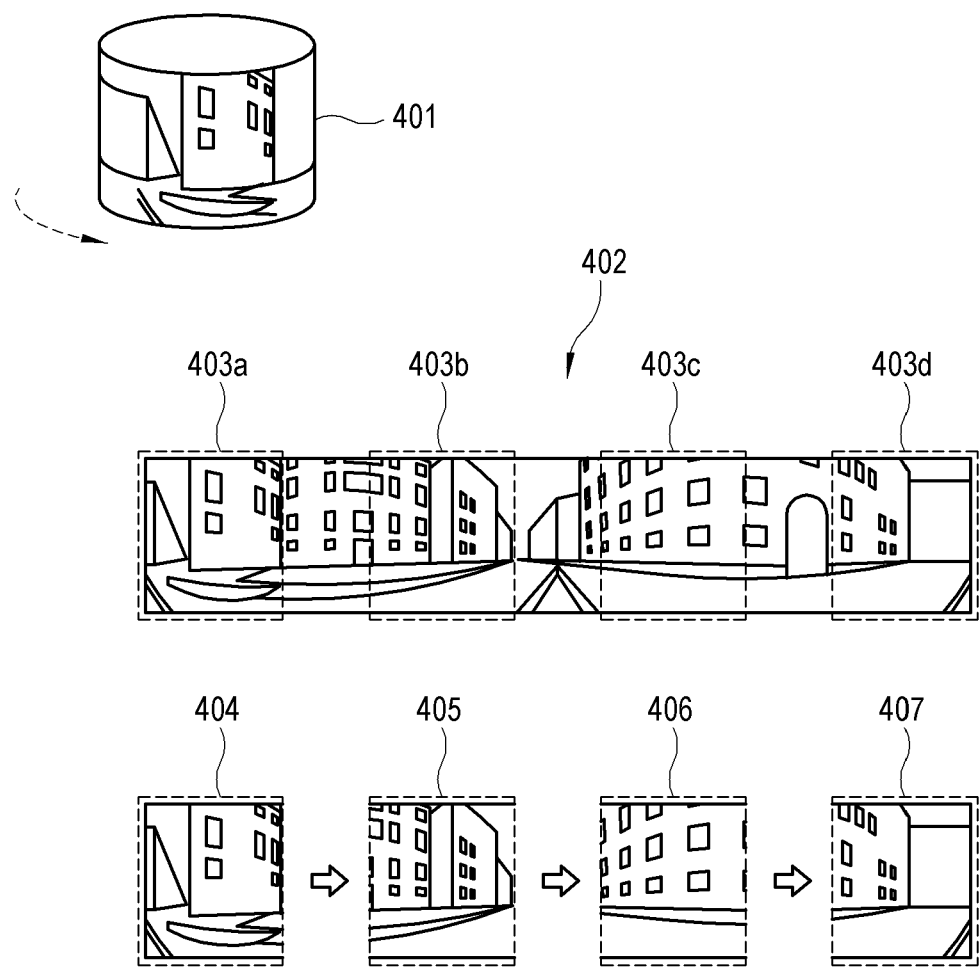

FIGS. 3 and 4 illustrate examples of a process of generating the thumbnail image in the display apparatus according to an exemplary embodiment, respectively. First, referring to FIG. 3, the processor 1103 determines a content image 301 for which the thumbnail image should be formed. According to an exemplary embodiment, the content image 102 before the mapping operation in FIG. 2 may be used as the content image 301 to be subject to forming the thumbnail image. However, the present disclosure is not limited thereto. For example, the content image to be subject to forming the thumbnail image may be the 3D image 106, in FIG. 2, after the mapping operation or the content image 101, in FIG. 2, extracted from the received image.

The processor 1103 determines a region 303 to be subject to forming the thumbnail image from among the content image 301. The region 303 to be subject to forming the thumbnail image may be, for example, a region in a range of plus and minus width "a" from the a horizontal axis 302, which passes a center in longitudinal direction of the content image 301. According to an exemplary embodiment, the plus and minus width "a" is predetermined. The axis may be determined by taking account of geometrical distortion position or the like in the content image 301. For example, since geometrical distortion in the content image 301 increasingly grows from a middle in longitudinal direction to a top or bottom in longitudinal direction of the content image 301, the horizontal axis 302 passing the center in longitudinal direction of the content image 301, which has relatively small distortion, may be determined as a criterion of the region 303. The predetermined plus and minus width "a" may be determined by places in which geometrical distortion level is properly permitted on the basis of the horizontal axis 302, which is the criterion. If the geometrical distortion level rapidly grows toward the top or bottom in longitudinal direction of the content image 301, the predetermined plus and minus width "a" may be determined to be relatively small. As discussed above, since the region 303 to be subject to forming the thumbnail image is determined as a portion in which the geometrical distortion level is relatively small as compared with that of other regions, the user may more clearly know the content via the thumbnail image. According to an exemplary embodiment in FIG. 3, the plus width "a" and minus width "a" are equal. However, according to another exemplary embodiment, the plus width "a" may be different from the minus width "a".

According to another exemplary embodiment, if the object of the thumbnail image to be formed is the 3D image after mapping, the object region may be an region within a range of predetermined plus and minus width on the basis of an outer circumference, which passes a center in longitudinal direction on a surface of corresponding 3D structure. According to another example, the region to be subject to forming the thumbnail image may be determined by the user. The processor 1103 may determine the region to be subject to forming the thumbnail image according to a user input. In this case, the processor 1103 may display a GUI including at least one menu item for designating the region to be subject to forming the thumbnail image and determine the region to be subject to forming the thumbnail image according to a user input received using the at least one menu item.

Referring again to FIG. 3, the processor 1103 extracts an image 304 corresponding to the object region 303 determined from the content image 301. The processor 1103 maps the extracted image 304 of the object region 303 to a predetermined 3D structure to generate a 3D image. Various 3D structures may be used as the 3D structure for mapping, but in the exemplary embodiment, a cylinder is explained by way of an example. According a user input or a predetermined method, the processor 1103 may select any one 3D structure to be used for mapping from among a plurality of 3D structures.

Referring to FIG. 4, the processor 1103 maps the extracted image 304 of the object region 303 to the cylinder to generate a 3D image 401 in the form of the cylinder. According to an exemplary embodiment, the processor 1103 may display as the thumbnail image, a region corresponding to one viewpoint from among the generated 3D image 401 in the form of the cylinder. The processor 1103 may display the thumbnail image for the viewpoint while moving the viewpoint of the 3D image 401, for example, while rotating the cylinder of the 3D image 401. The processor 1103 may move the viewpoint of the 3D image 401 in a predetermined method, or according to a user input. Also, types of moving the viewpoint or ways of rotating the 3D image are not limited to the example illustrated in FIG. 4. For example, the processor 1103 may change a direction, a speed or the like of viewpoint movement, move the viewpoint while continuously or discontinuously changing the direction, the speed or the like of viewpoint movement, or change a size, a shape or the like of the object region. The processor 1103 may store information on viewpoint movement way set according to a user input received using the GUI, and move the viewpoint of the thumbnail image based on the stored information.

Referring again to FIG. 4, reference numeral 402 illustrates an image developing a side of the cylinder, which is an example of the 3D image 401. According to another exemplary embodiment, the processor 1103 may display as the thumbnail image, a portion corresponding to one of the view point regions 403a, 403b, 403c and 403d as one viewpoint of the 3D image 401 from among the image 402 developed from the 3D image 401. The processor 1103 may, while moving the viewpoint of the 3D image 401, i.e., moving through the viewpoint regions 403a, 403b, 403c and 403d in the developed image 402, display portions corresponding to moved viewpoint regions 403a, 403b, 403c and 403d as thumbnail images. In this case, thumbnail images 404, 405, 406 and 407 corresponding to the moved viewpoint regions 403a, 403b, 403c and 403d, respectively, may be sequentially displayed. Like this, the user may more clearly know images of 360 degree/VR content via the thumbnail images and also acquire more enhanced experience and interest.

Figure 5A:
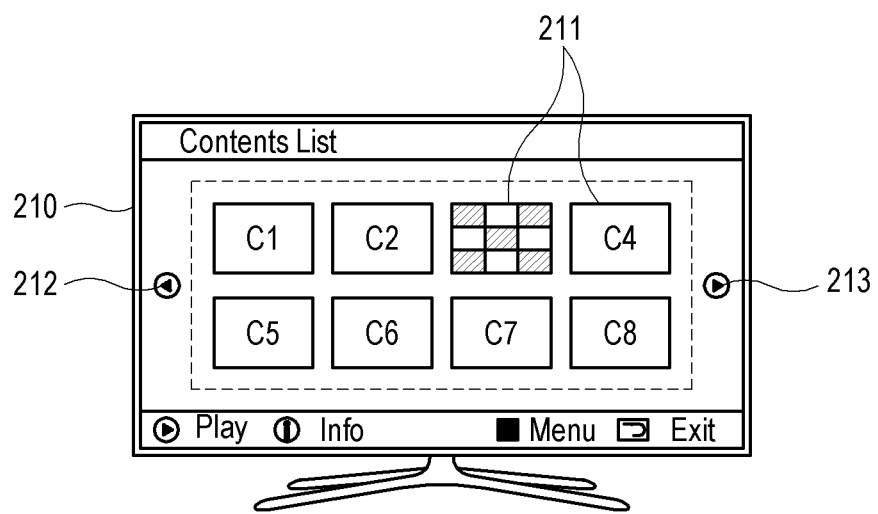
FIGS. 5A-5C, 6A-6C, 7A-7B, 8, 9A-9C, 10A-10C, 11A-11B, 12A-12C and 13A-13C are drawings illustrating examples of a content image or a thumbnail image displayed by the display apparatus according to an exemplary embodiment.
Figure 5B:
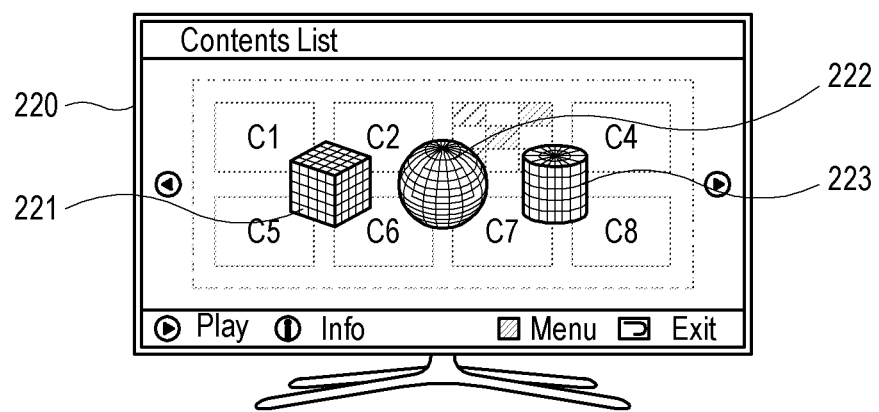
Figure 5C:
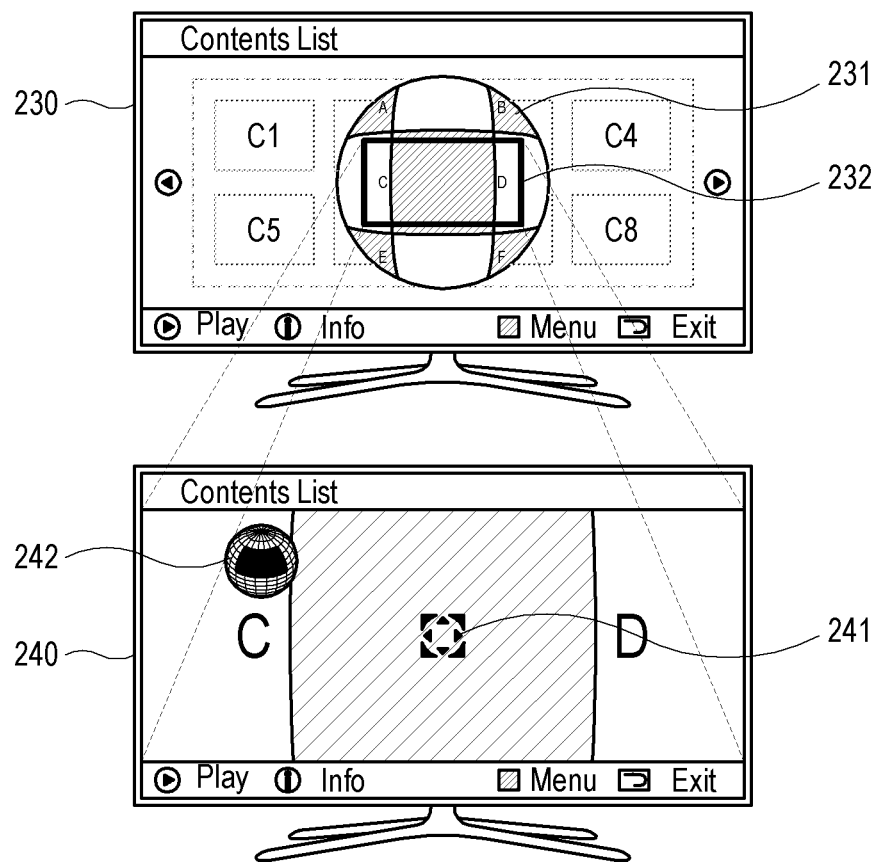

Hereinafter, various exemplary embodiments of displaying the content image and/or the thumbnail image by the display apparatus according to an exemplary embodiment will be described in detail. FIGS. 5A-5C illustrate an example of a screen displayed by the display apparatus according to an exemplary embodiment. The processor 1103 according to an exemplary embodiment may display on a screen 210, contents displayable by the display apparatus 1 in the form of a list as shown in FIG. 5A. The contents list may include displaying in the form of a GUI including a plurality of items 211, which represents portions of the content images, respectively. The GUI may further include left and right navigation buttons 212 and 213. If the left and right navigation buttons 212 or 213 is selected according to a user input, the processor 1103 display items of other contents, which have been hidden from the current screen 210, in the same manner.

If according to a user input, any one item is selected from among the plurality of items of the contents list as illustrated in FIG. 5B, the processor 1103 may display on a screen 220, various 3D structures 221, 222 and 223, so that the user can select a 3D structure to which she or he wants to map the corresponding content image to map. To intuitively represent that the user can select any one from among the displayed various 3D structures 221, 222 and 223, the processor 1103 may display the GUI of the contents list, which have been just previously displayed, to have a predetermined transparency, thereby allowing the GUI of the contents list to be displayed as a background for the various 3D structures. If the user selects one 3D structure from among the various 3D structures 221, 222 and 223 displayed on the screen 220, for example, the user selects a sphere 222, the processor 1103 displays on a screen 230, an image 231 in which the content image previously selected by the user is mapped in the form of the sphere 222 as illustrated in FIG. 5C.

Figure 7A:
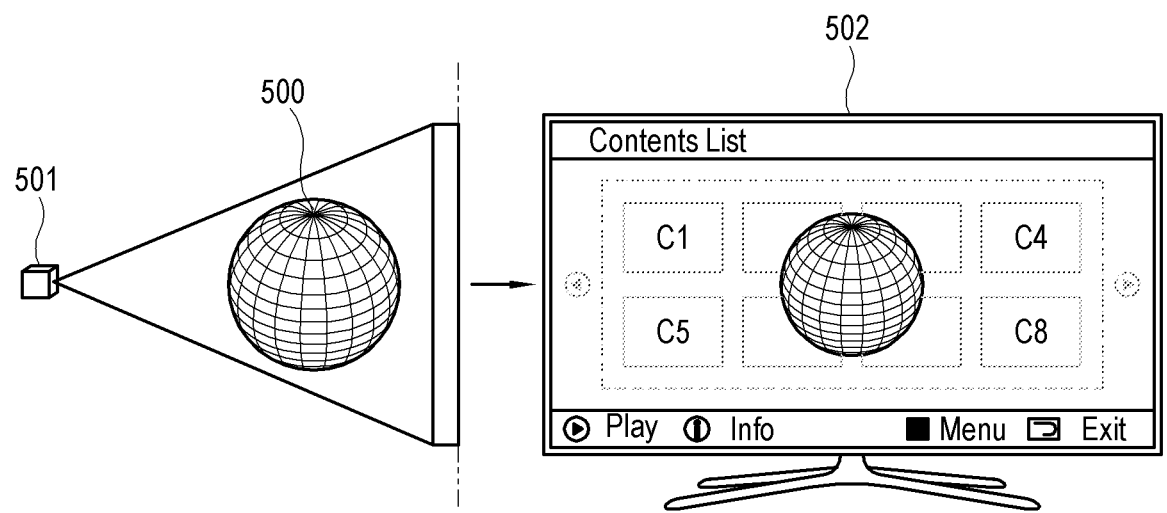
Figure 7B:
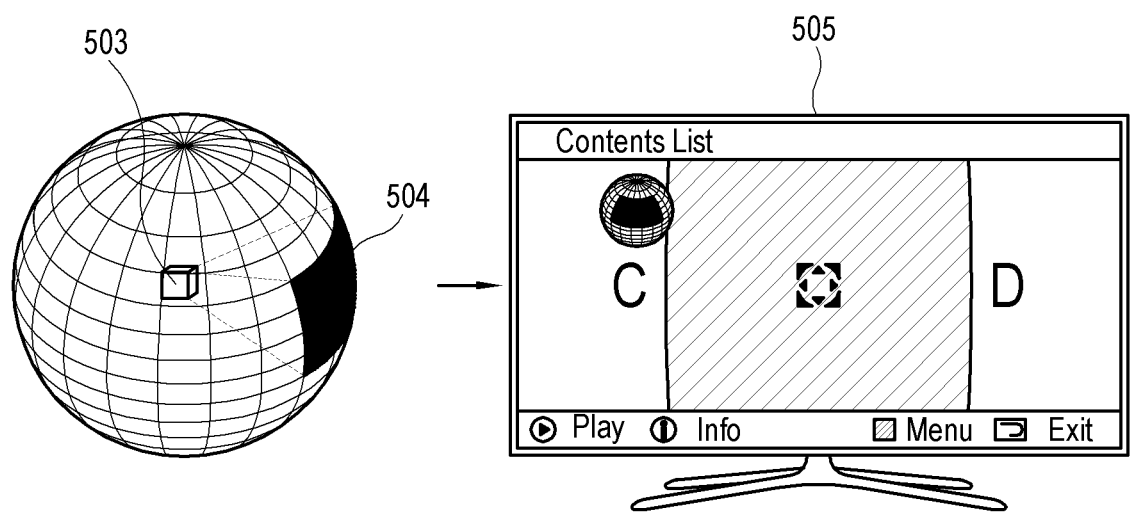

The processor 1103 may display the image mapped to the 3D structure elected by the user as the image 231 mapped to the corresponding 3D structure at an outer viewpoint or an image 240 mapped to the corresponding 3D structure at an inner viewpoint as illustrated in FIG. 5C. Alternatively, the processor 1103 may first display the image 231 mapped at the outer viewpoint and then the image 240 mapped at the inner viewpoint. According to an exemplary embodiment, the outer viewpoint is a view from outside of the 3D structure and the inner viewpoint is a view from inside of the 3D structure as illustrated in FIGS. 7A and 7B.

The processor 1103 may display, so that the images 231 and 240 displayed on the screen are changed according to viewpoint movement. The processor 1103 may further include a navigation icon 241 in which a direction indicator for indicating up and down directions and left and right directions is marked, to inform the user that the displayed image can be changed into an image of another viewpoint. The processor 1103 may further display an icon 242 which represents an area where an image of current viewpoint is located in the full 3D image, thereby allowing the user to more intuitively know a location of the image that the user is now watching.

Figure 6A:
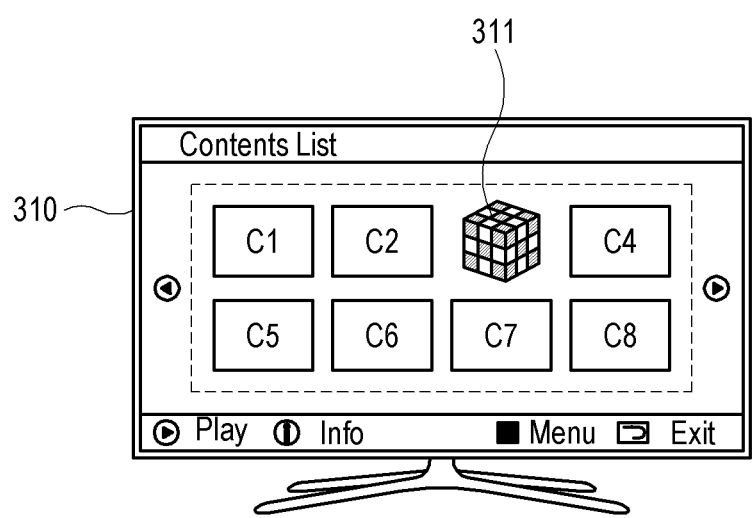
Figure 6B:
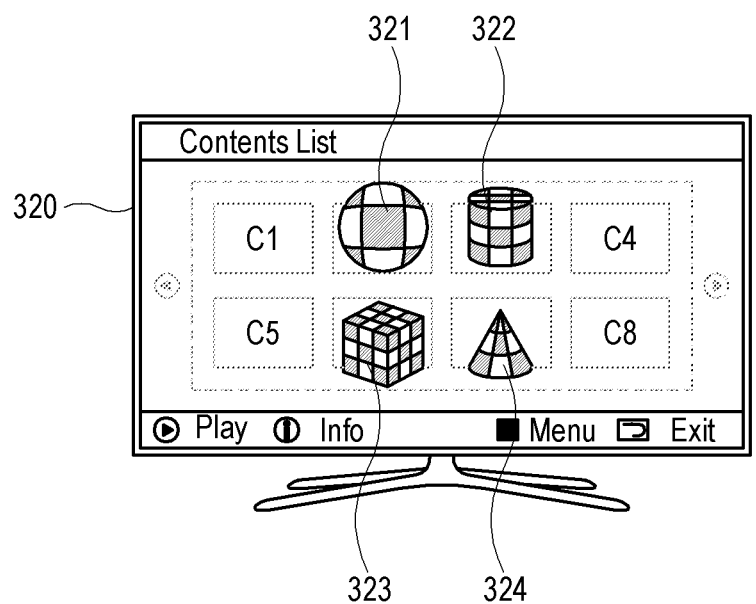
Figure 6C:
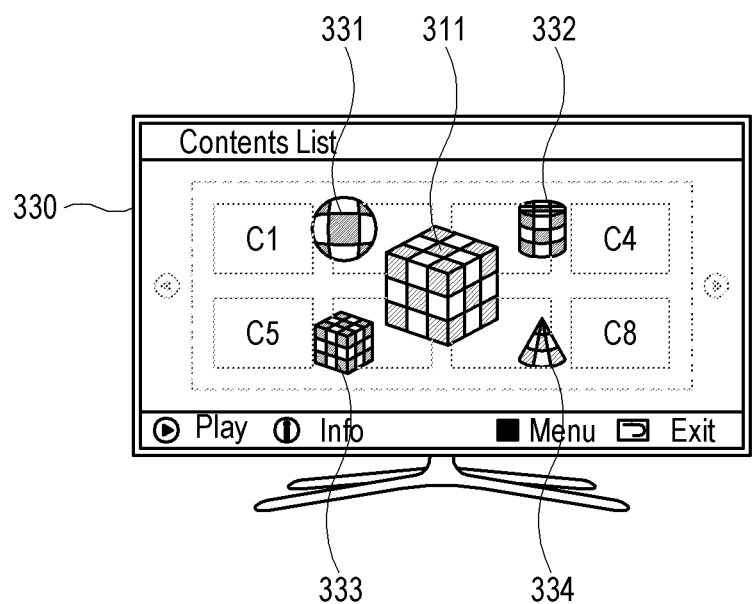

FIGS. 6A-6C illustrate an example of a thumbnail image displaying screen of the display apparatus according to an exemplary embodiment. The processor 1103 may display a GUI 310 including at least one thumbnail image 311 in the form of a 3D structure (hereinafter, also referred to a '3D thumbnail display mode') as shown in FIG. 6A. The processor 1103 may enter the 3D thumbnail display mode, for example, according to a user input. If the user inputs a contents list-displaying command, the processor 1103 may determine whether there are contents of 3D image in contents to be displayed and if it is determined that there are the contents of 3D image, enter the 3D thumbnail display mode. The processor 1103 may further display other information for explaining contents, for example, texts, images and so on, besides the thumbnail image.

In the 3D thumbnail display mode, the processor 1103 may control a cursor for the GUI 310 according a user input received using, for example, the remote controller, to select one thumbnail image from among the thumbnail images. The processor 1103 may display a GUI 320 including a plurality of thumbnails 321, 322, 323 and 324 having different 3D structures with respect to one content (hereinafter, also referred to a 'multi thumbnail display mode') as shown in FIG. 6B. If the user selects any one thumbnail image 311 at the 3D thumbnail display mode, the processor 1103 may enter the multi thumbnail display mode for a content of the selected thumbnail image 311. The processor 1103 may display a menu prompting the user to input an instruction indicating whether to enter the multi thumbnail display mode, and enter the multi thumbnail display mode according to a user input thereto. Although in FIG. 6B, the plurality of thumbnail images 321, 322, 323 and 324 has been illustrated in the form of a sphere, a cylinder, a cube, and a cone, respectively, those are merely examples and the forms of 3D structure are not limited thereto. The thumbnail images 321, 322, 323 and 324 may be generated in the same manner as described above with reference to FIGS. 2 to 4.

According to another exemplary embodiment, the processor 1103 may enter the multi thumbnail display mode, for example, if the user selects any one of the thumbnail images while pressing and holding one button of the remote controller. According to another exemplary embodiment, if the user selects any one thumbnail image 311, the processor 1103 may display a GUI 330, which represents a plurality of thumbnail images 331 to 334 having different 3D structures while being relatively small in size as compared with the selected thumbnail image 311, around the selected thumbnail image 311 as illustrated in FIG. 6C.

According to another exemplary embodiment, the processor 1103 may display a plurality of thumbnail images for contents different from each other without differentiating therebetween, or display arranging a plurality of thumbnail images for each content in the same row and column Like this, the display apparatus 1 according to an exemplary embodiment may display the thumbnail images having various forms of 3D structures with respect to one content, thereby providing more enhanced experience and interest for the user.

The processor 1103 may perform a predetermined operation according to a user input via the GUI 310, 320 or 330 including the thumbnail images. Here, the predetermined operation includes all operations that the display apparatus 1 can perform with respect to the contents corresponding to the thumbnail images. Examples of the predetermined operation includes playing contents corresponding to thumbnail images, displaying thumbnail images and content images in inner or outer viewpoint of 3D structures, setting 3D structures into basic 3D structures, rotating thumbnail images, changing thumbnail images in size, changing thumbnail images in forms of 3D structures, etc., but are not limited thereto. The user input to the GUI 310, 320 or 330 including the thumbnail images includes a gesture input using parts of human body, as well as inputs using, for example, a remote controller, a mouse, a touch pen, etc. Examples of the input methods include cursor focusing, click, double click, drag and drop, touch, tap, double tap, drag, pinch in/out, multi touch, etc. For example, if the user selects any one thumbnail image 321 or 331 from the GUI 320 or 330 as illustrated in FIGS. 6B or 6C, the processor 1103 may play a content corresponding to the selected thumbnail image 321 or 331. If the content is a still image, the processor 1103 may display the still image on the screen, and if a motion image, play the motion image to display it on the screen.

The processor 1103 may change a form of 3D structure in which the content is played, according to a user input via the GUI 320 or 330. For example, if in a state where the thumbnail image 323 or 333 of the cube is selected, a user input, which instructs to play a content corresponding thereto, is input, the processor 1103 may play the content with a 3D structure of the cube. On the other hand, if in a state where the thumbnail image 321 or 331 of the sphere is selected, a user input, which instructs to play a content corresponding thereto, is inputted, the processor 1103 may play the content with a 3D structure of the sphere.

FIGS. 7A and 7B illustrate an example of a thumbnail image displaying screen of the display apparatus according to an exemplary embodiment. If, for example, a 3D structure 500, which is a sphere, is viewed from an outer viewpoint 501, the processor 1103 displays an image 502 of a region including the whole of spherical image. Accordingly, the user may watch general appearance of the spherical image as shown in FIG. 7A. On the other hand, if the 3D structure 500, which the sphere, is viewed from an inner viewpoint 503, the processor 1103 displays an image 505 of a region 504 inner corresponding to the viewpoint 503 from among the spherical image as shown in FIG. 7B. The processor 1103 may convert the viewpoint from the inner viewpoint 503 to the outer viewpoint 501 and vice versa to display the thumbnail image. The conversion between the viewpoints 503 and the viewpoint 501 may be carried out according to a predetermined condition or a user input. The processor 1103 may perform the conversion between the viewpoints 503 and the viewpoint 501 directly or going through an intermediate process therebetween.

Figure 8:
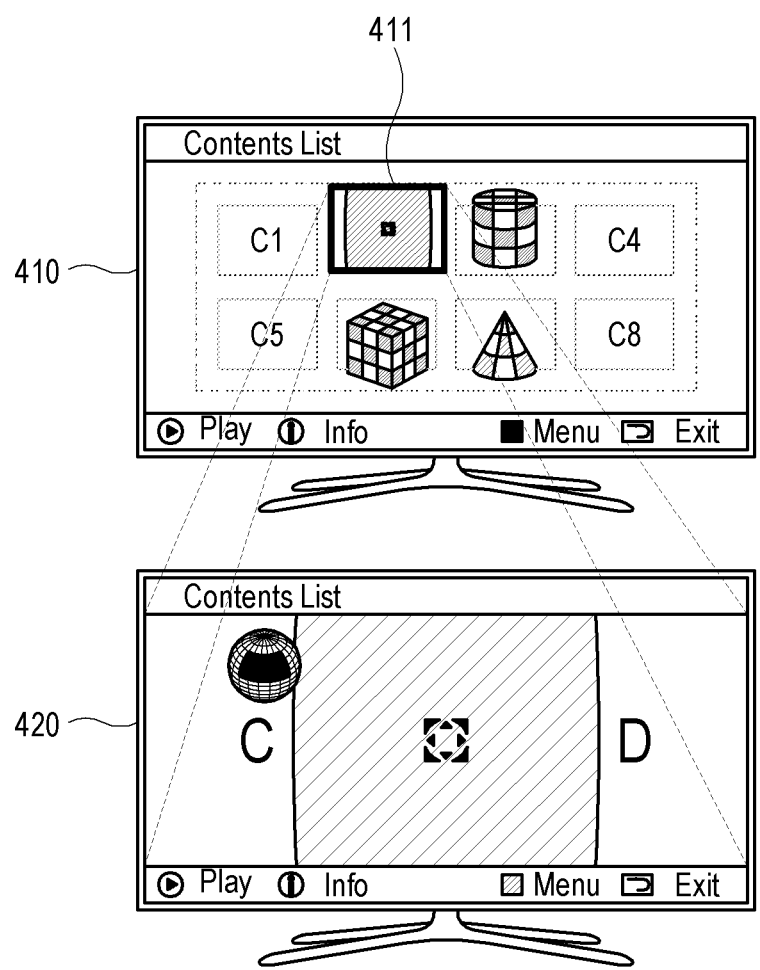

FIG. 8 illustrates another example of the thumbnail image displaying screen of the display apparatus according to an exemplary embodiment. When the user selects a thumbnail image 411 from a GUI 410, the processor 1103 may provide as the thumbnail image 411, a thumbnail image corresponding to an inner viewpoint of 3D structure. Accordingly, the user may check on corresponding content image in advance with the inner viewpoint, thereby enhancing user's convenience. The processor 1103 may simultaneously display a plurality of thumbnail images having different 3D structures from the inner viewpoint. Accordingly, the user may compare inner viewpoint pictures of contents having various forms of 3D structures with one another, thereby more enhancing user's convenience. When the thumbnail image of one viewpoint is displayed, the processor 1103 may display an image 420 corresponding to the thumbnail image on the entire screen of the display apparatus 1. Also, when the image 420 is displayed on the entire screen of the display apparatus 1, the processor 1103 may display the thumbnail image of one viewpoint again. As such, the display apparatus 1 according to an exemplary embodiment may convert and display the thumbnail image in various ways, thereby allowing the user to easily apprehend the contents and more enhancing user's experience and interest.

Figure 9A:
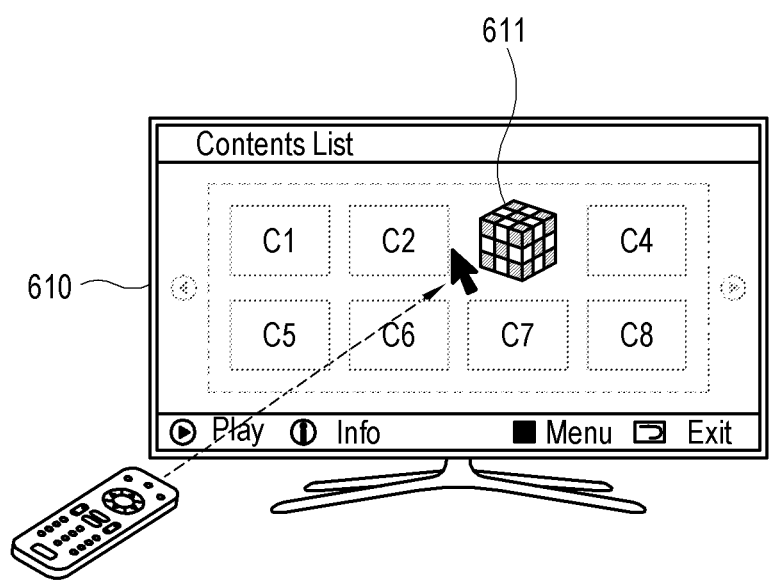
Figure 9B:
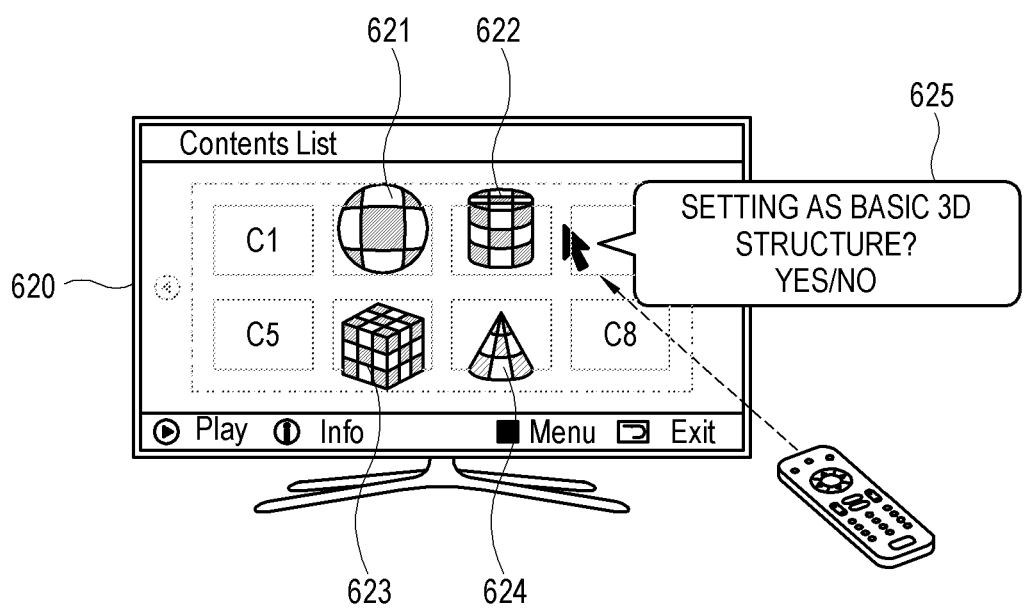
Figure 9C:
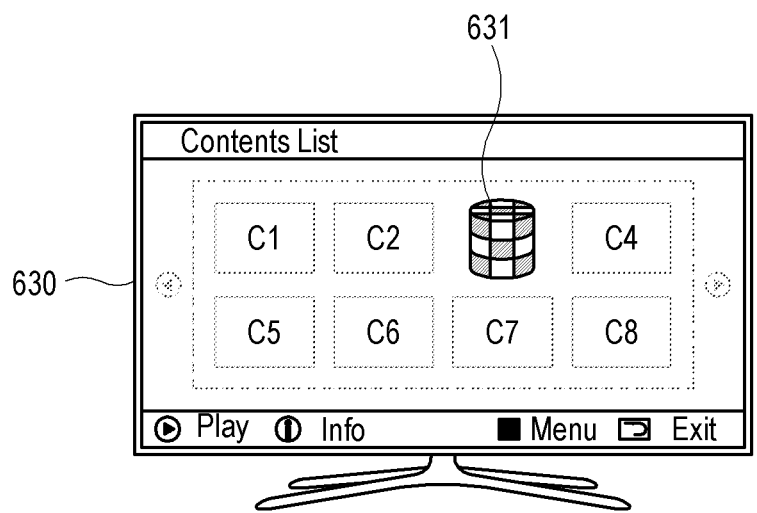

FIGS. 9A-9C illustrate another example of the thumbnail image displaying screen of the display apparatus according to an exemplary embodiment. The processor 1103 displays a first GUI 610 including a thumbnail image 611 having a cube form as a basic form of 3D structure, as illustrated in FIG. 9A. If the thumbnail image 611 is selected according to a user input via the first GUI 610, the processor 1103 displays a plurality of thumbnail images 621, 622, 623, and 624 having different 3D structures on the screen 620, as illustrated in FIG. 9B. While the plurality of thumbnail images 621, 622, 623, and 624 having different 3D structures is displayed, the processor 1103 may set any one 3D structure as a basic 3D structure according to a user input. For example, if the user selects a first thumbnail image 622 from among the plurality of thumbnail images 621, 622, 623, and 624, the processor 1103 may display a menu screen 625 prompting the user to input an instruction indicating whether to set a new basic 3D structure. If the user selects 'Yes' in the menu screen 625, the processor 1103 sets as a new basic 3D structure, a cylinder, which is a form of 3D structure of the selected first thumbnail image 622. The processor 1103 may store information on the set basic 3D structure in a storage. Thereafter, the processor 1103 may display a second GUI 630 of a thumbnail image 631 having the 3D structure of the cylinder set as the new basic 3D structure as illustrated in FIG. 9C. Accordingly, the thumbnail image 611 of the first GUI 610, which have been displayed in the form of the cube as the basic 3D structure, may be changed to the thumbnail image 631 of the second GUI 630 having the 3D structure of the cylinder.

Figure 10A:
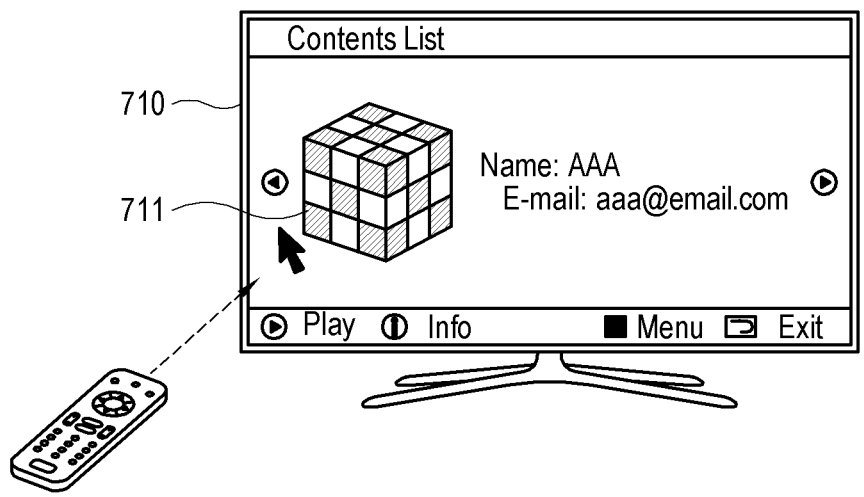
Figure 10B:
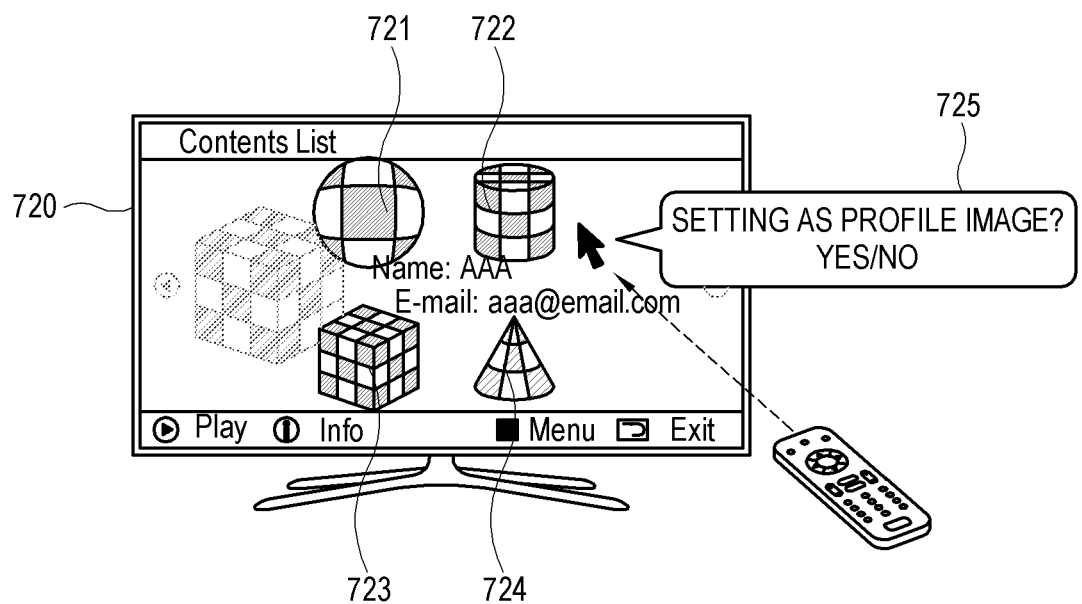
Figure 10C:
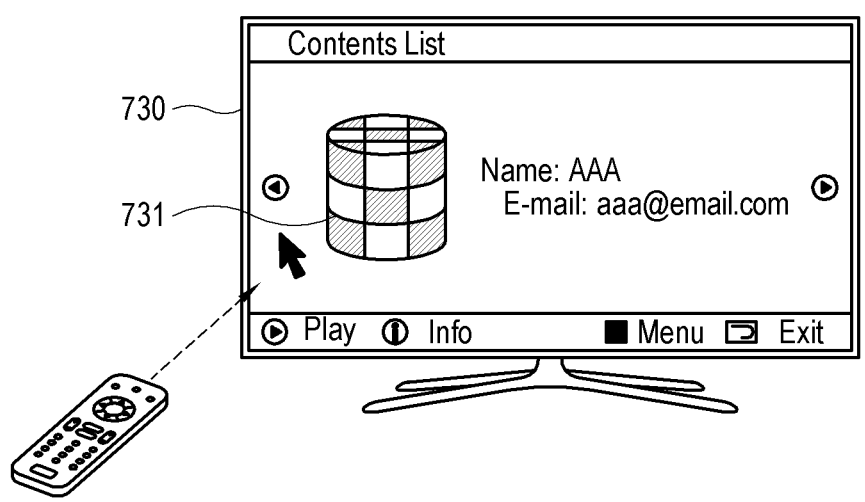

FIGS. 10A-10C illustrate another example of the thumbnail image displaying screen of the display apparatus according to an exemplary embodiment. The processor 1103 displays a first GUI 710 including a thumbnail image 711 representing user's profile as illustrated in FIG. 10A. The thumbnail image 711 may represent user's profile image in a 3D structure of cube. If the user selects the thumbnail image 711 from the first GUI 710, the processor 1103 displays a plurality of thumbnail images 721, 722, 723 and 724 having different 3D structures with respect to the user's profile image on the screen 720 as illustrated in FIG. 10B. If the user selects any one thumbnail image 722 from among the plurality of thumbnail images 721, 722, 723 and 724, the processor 1103 may display a menu screen 725 the user to input an instruction indicating whether to set a new profile image. If the user selects 'Yes' from the menu screen 725, the processor 1103 sets a cylinder, which is a 3D structure for the selected thumbnail image 722, as a 3D structure for the profile image. In a subsequent display request for profile screen of the user, the processor 1103 displays a second GUI 730 including a thumbnail image 731 displayed in the 3D structure of the cylinder as illustrated in FIG. 10C.

Figure 11A:
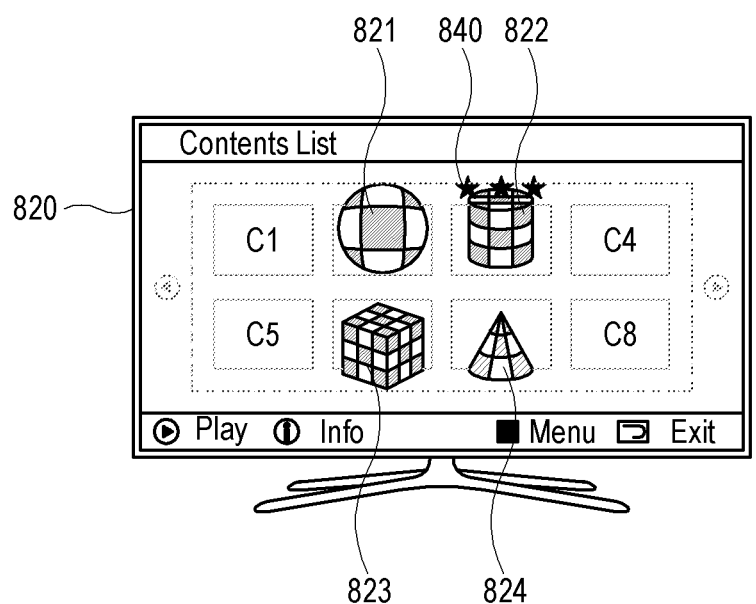
Figure 11B:
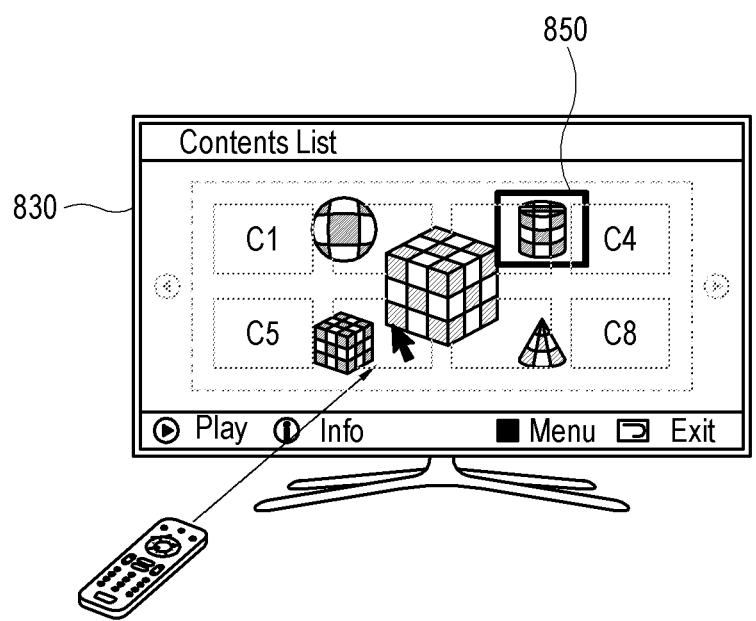

The display apparatus 1 according to an exemplary embodiment may display at least one thumbnail image among the plurality of thumbnail images to be distinguished from other thumbnail images. FIGS. 11A and 11B illustrate another example of the thumbnail image displaying screen of the display apparatus according to an exemplary embodiment. The processor 1103 displays a GUI 820 including a plurality of thumbnail images 821, 822, 823 and 824. The processor 1103 may display an item 840, which allows any one thumbnail image 822 among the plurality of thumbnail images 821, 822, 823 and 824 to be distinguished from other thumbnail images. According to other exemplary embodiment, displaying at least one thumbnail image to be distinguished from other thumbnail images may be implemented in various manner. For example, the corresponding thumbnail image may have a specific letter or character, a specific figure (i.e., stars 840) or the like displayed thereon. According to another example, the corresponding thumbnail image may be bordered (see 850 in FIG. 11B), highlighted with fluorescent color or the like, animated to dynamically move, and so on. Accordingly, the user may easily recognize the thumbnail image displayed in distinct from other thumbnail images, thereby enhancing user's convenience.

The processor 1103 may determine a 3D structures for the thumbnail image according to an attribute of the content. For example, if the content is an image photographed in all directions with a camera having at least more than one lens mounted thereon or a plurality of cameras, the processor 1103 may display a thumbnail image 821 of sphere. Alternatively, if the content is an image generated omnidirectionally photographing things in a room in the form of a cube, the processor 1103 may display a thumbnail image 823 in the form of the cube. However, the form of 3D structure for the thumbnail image corresponding to the content are not limited thereto.

Figure 12A:
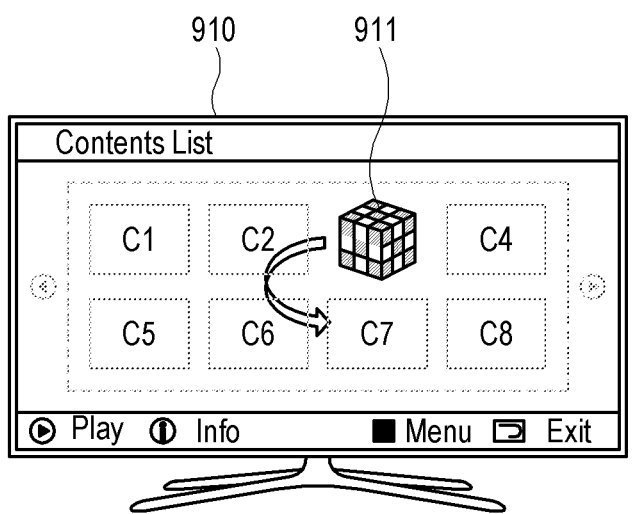
Figure 12B:
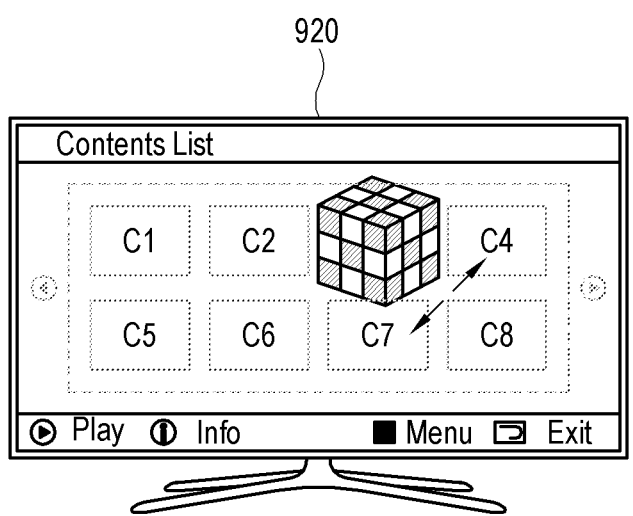
Figure 12C:
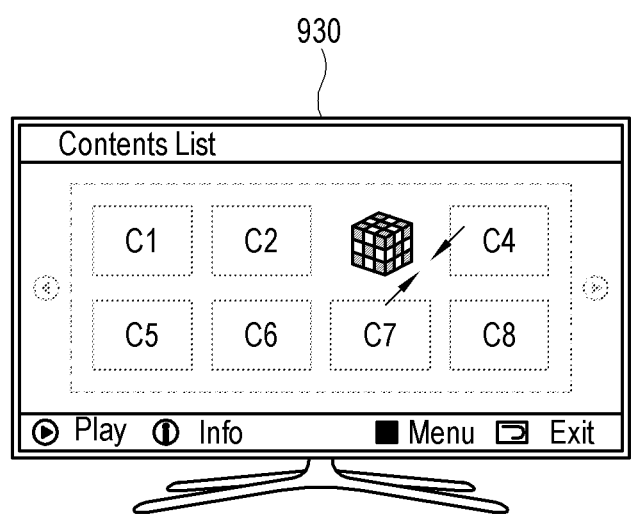

The display apparatus 1 according to an exemplary embodiment may change and display the thumbnail image according to viewpoint movement. FIGS. 12A-12C illustrate another example of the thumbnail image displaying screen of the display apparatus according to an exemplary embodiment. The processor 1103 displays a GUI 910 including a thumbnail image 911 with a predetermined form of 3D structure as illustrated in FIG. 12A. The processor 1103 may change and display the thumbnail image 911 according to the viewpoint movement. For example, if the viewpoint is moved left and right, the processor 1103 may also display the thumbnail image 911 to rotate left and right according to the viewpoint movement. According to an exemplary embodiment, the thumbnail image 911 may rotate from left to right as demonstrated by the arrow 12. However, the moving direction of the viewpoint is not limited thereto and the viewpoint may be moved up, down, left, right, diagonally, etc. The viewpoint movement may be carried out according a user input or a predetermined way. According to another exemplary embodiment, the processor 1103 may change the thumbnail image in size to display the changed thumbnail image. In order words, the processor 1103 may display zooming in of the thumbnail image as illustrated in screen 920 of FIG. 12B or zooming out of the thumbnail image as illustrated in screen 920 of FIG. 12C. The change in size of the thumbnail image may be carried out according to a user input or a predetermined manner.

Figure 13A:
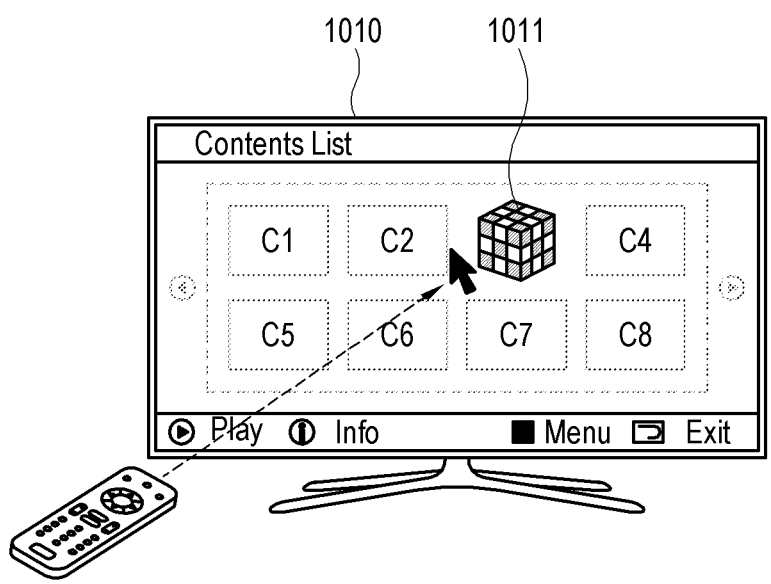
Figure 13B:
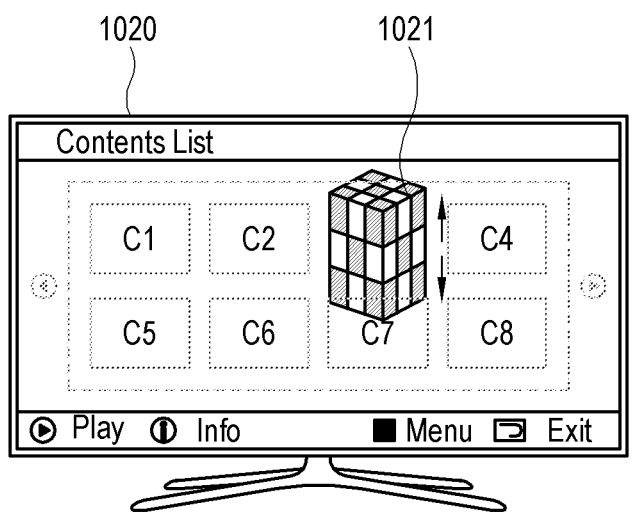
Figure 13C:
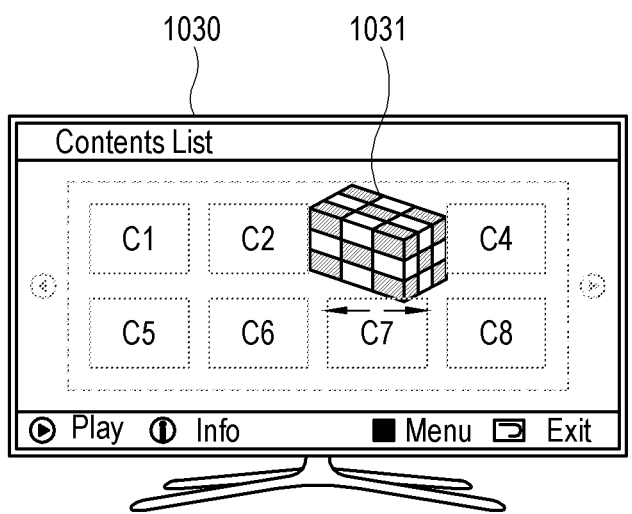

The display apparatus 1 according to an exemplary embodiment may display changing a 3D structure for the thumbnail image in form. FIGS. 13A-13C illustrate another example of the thumbnail image displaying screen of the display apparatus according to an exemplary embodiment.

The processor 1103 displays a GUI 1010 including a thumbnail image 1011 with a predetermined form of 3D structure as illustrated in FIG. 13A. The processor 1103 may change the form of 3D structure for the thumbnail image 1011. For example, as illustrated in GUI 1020 of FIG. 13B, the processor may change the thumbnail image 1011 to a thumbnail image 1021 in the form of a cuboid longitudinally elongated as compared the thumbnail 1011. According to another exemplary embodiment as illustrated in GUI 1030 of FIG. 13C, the processor 1103 may change the thumbnail image 1011 to a thumbnail image 1031 in the form of a cuboid transversely elongated as compared the thumbnail 1011. However, the deformable form of 3D structure is not limited thereto. The change in form of 3D structure for the thumbnail image may be carried out according to a user input or a predetermined method.

Figure 14:
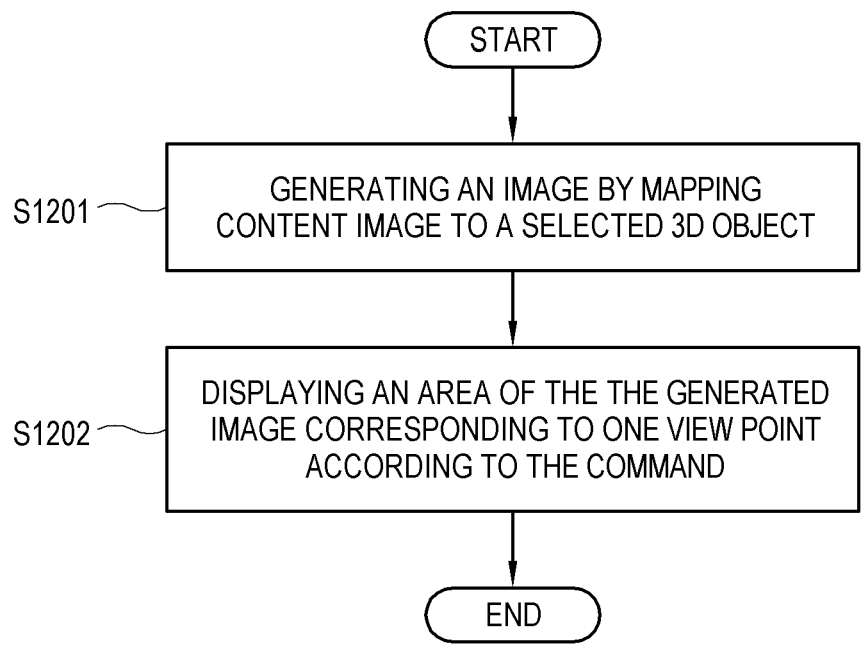
FIG. 14 is a flowchart illustrating a control method of the display apparatus according to an exemplary embodiment.

FIG. 14 is a flowchart illustrating a control method of the display apparatus according to an exemplary embodiment. The control method of the display apparatus to be described with reference to FIG. 14 may be carried out by the display apparatus described with reference to FIGS. 1, 2, 3, 4, 5A-5C, 6A-6C, 7A-7B, 8, 9A-9C, 10A-10C, 11A-11B, 12A-12C and 13A-13C. As illustrated in FIG. 14, the display apparatus maps an image of content to one 3D structure selected from among a plurality of 3D structures having different forms (S1201). The display apparatus displays a region of the image of the content mapped to the selected one 3D structure according to a user command requesting viewpoint movement (S1202)

As described above, according to the exemplary embodiments, the user may enjoy the contents in the desired 3D structure selected through a user input.

Further, according to the exemplary embodiments, the display apparatus may provide the thumbnail images for 360 degree/VR contents by which the user may easily know that they correspond to 360 degree/VR images, respectively, and which may show information for contents corresponding thereto without distortion.

Furthermore, according to the exemplary embodiments, the display apparatus may provide the thumbnail images for contents in various ways, thereby providing entertainment in UI/UX aspects for the user.

Methods according to various exemplary embodiments of the present disclosure described above may be embodied as an application type that may be installed in electronic devices, i.e., display devices or mobile display devices.

The methods according to the various exemplary embodiments of the present disclosure described above may also be embodied by merely upgrading software or hardware of electronic devices, i.e., display devices or mobile display devices.

According to an exemplary embodiment, the elements, components, methods or operations described herein may be implemented using hardware components, software components, or a combination thereof. For example, the hardware components may include a processing device. According to an exemplary embodiment, the display apparatus may include a processing device, such as the image processor or the controller, that may be implemented using one or more general-purpose or special purpose computers, such as, for example, a hardware processor, a CPU, a hardware controller, an ALU, a DSP, a microcomputer, an FPGA, a PLU, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

According to an exemplary embodiment of the present disclosure, the various exemplary embodiments described above may be embodied as software including instructions stored in machine-readable storage media (e.g., computer-readable storage media). A device may an apparatus that calls an instruction from a storage medium, may operate according to the called instruction, and may include an electronic device (e.g., an electronic device A) according to disclosed exemplary embodiments. If the instruction is executed by a processor, the processor may directly perform a function corresponding to the instruction or the function may be performed by using other types of elements under control of the processor. The instruction may include codes generated or executed by a compiler or an interpreter. Computer instructions for performing a processing operation of a device according to the above-described various exemplary embodiments may be stored in a non-transitory computer-readable medium. The computer instructions stored in the non-transitory computer-readable medium enable a particular device to perform a processing operation in a device according to the above-described exemplary embodiments when being executed by a processor of the particular device. The non-transitory computer readable medium is a medium which does not store data temporarily such as a register, cash, and memory but stores data semi-permanently and is readable by devices. More specifically, the aforementioned applications or programs may be stored in the non-transitory computer readable media such as compact disks (CDs), digital video disks (DVDs), hard disks, Blu-ray disks, universal serial buses (USBs), memory cards, and read-only memory (ROM).

Each of elements according to the above-described various exemplary embodiments (e.g., modules or programs) may include a single entity or a plurality of entities, and some of corresponding sub elements described above may be omitted or other types of sub elements may be further included in the various exemplary embodiments. Alternatively or additionally, some elements (e.g., modules or programs) may be integrated into one entity and then may equally or similarly perform a function performed by each of corresponding elements that are not integrated. Operations performed by modules, programs, or other types of elements according to the various exemplary embodiments may be sequentially, in parallel, or heuristically executed or at least some operations may be executed in different sequences or may be omitted, or other types of operations may be added.

The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

What is claimed is:

1. A display apparatus comprising:
a display;
a sensor configured to receive a user input; and a processor configured to:
  control the display to display a content list including a plurality of thumbnails corresponding to a plurality of contents, respectively,
  identify a region of a content image for generating a thumbnail for representing a content among the plurality of contents, wherein the content image is an image to be mapped to a three-dimensional (3D) object for playback of the content, and wherein the region has a predefined range of plus and minus a predetermined width in a first direction from axis in a second direction of the content image, the axis being determined based on a geometrical distortion of the content image;
  control the display to display the generated thumbnail for representing the content, wherein the generated thumbnail is a moving image displaying a plurality of sub-images sequentially, the plurality of sub-images being generated by moving a viewpoint in the second direction with respect to the region of the content image;
  based on a user input for selecting the generated thumbnail being received via the sensor, perform an operation for generating an image by mapping the content image to the 3D object; and
  control the display to display an area of the generated image corresponding to one viewpoint of the generated image,
  wherein the first direction and the second direction are perpendicular to each other.

2. The display apparatus according to claim 1, wherein the processor is further configured to control the display to display a graphical user interface (GUI) including the generated thumbnail on the display.

3. The display apparatus according to claim 2, wherein the processor is further configured to generate the thumbnail by mapping the region of the content image, in a predetermined width from a reference axis of the content image, to the 3D object.

4. The display apparatus according to claim 2, wherein the processor is further configured to:
  map the content image to each of a plurality of 3D objects having different geometrical forms to generate a plurality of images corresponding to the content image, and
  generate a plurality of thumbnail images each corresponding to one viewpoint of each of the plurality of images.

5. The display apparatus according to claim 4, wherein the processor is further configured to control the display to display at least one thumbnail image among the plurality of thumbnail images to be distinguished from other thumbnail images.

6. The display apparatus according to claim 5, wherein the processor is further configured to control the display to display the at least one thumbnail image among the plurality of thumbnail images to be distinguished from the other thumbnail images, based on an attribute of the content of the content image.

7. The display apparatus according to claim 4, wherein the plurality of 3D objects comprises at least one cube, sphere, cylinder or cone.

8. The display apparatus according to claim 2, wherein the processor is further configured to change a size of the generated thumbnail to generate a changed thumbnail and control the display to display the changed thumbnail.

9. The display apparatus according to claim 1, wherein the processor is configured to control the display to display a first thumbnail of a first 3D object among a plurality of 3D objects with respect to a content of the content image, and change the first thumbnail of the first 3D object into a second thumbnail of a second 3D object among the plurality of 3D objects in response to a selection of the second 3D object, and control the display to display the second thumbnail.

10. The display apparatus according to claim 1, wherein the sensor is configured to receive a command that is a user input to select the viewpoint of the generated image.

11. A control method of a display apparatus comprising:
  controlling a display to display a content list including a plurality of thumbnails corresponding to a plurality of contents, respectively,
  identifying a region of a content image for generating a thumbnail for representing a content among the plurality of contents, wherein the content image is an image to be mapped to a three-dimensional (3D) object for playback of the content, and wherein the region has a predefined range of plus and minus a predetermined width in a first direction from axis in a second direction of the content image, the axis being determined based on a geometrical distortion of the content image;
  displaying, on the display, the generated thumbnail for representing the content, wherein the generated thumbnail is a moving image displaying a plurality of sub-images sequentially, the plurality of sub-images being generated by moving a viewpoint in the second direction with respect to the region of the content image;
  based on a user input for selecting the generated thumbnail being received via a sensor, performing an operation for generating an image by mapping the content image to the 3D object; and
  displaying, on the display, an area of the generated image corresponding to one viewpoint of the generated image,
  wherein the first direction and the second direction are perpendicular to each other.

12. The method according to claim 11, further comprising displaying a graphical user interface (GUI) including the generated thumbnail on the display.

13. The method according to claim 12, wherein the generating the thumbnail comprises mapping the region, in a predetermined width from a reference axis of the content image, to the 3D object.

14. The method according to claim 12, wherein the generating the thumbnail image comprises:
  mapping the content image to each of a plurality of 3D objects having different forms to generate a plurality of images corresponding to the content image; and
  generating a plurality of thumbnail images each corresponding to one viewpoint of each of the plurality of images.

15. The method according to claim 14, wherein the generating the thumbnail image comprises distinguishing at least one thumbnail image among the plurality of thumbnail images from other thumbnail images.

16. The method according to claim 15, wherein the distinguishing comprises distinguishing the at least one thumbnail image among the plurality of thumbnail images from the other thumbnail images, based on an attribute of the content of the content image.

17. The method according to claim 14, wherein the plurality of 3D objects comprises at least one cube, sphere, cylinder or cone.

18. The method according to claim 12, further comprising changing a size of the generated thumbnail to generate a changed thumbnail and displaying the changed thumbnail.

19. The method according to claim 12, further comprising receiving a command that is a user input to select the viewpoint of the generated image.

20. The method according to claim 11, further comprising displaying a first thumbnail of a first 3D object among a plurality of 3D objects with respect to a content of the content image, and changing the first thumbnail of the first 3D object into a second thumbnail of a second 3D object among the plurality of 3D objects in response to a selection of the second 3D object, and displaying the second thumbnail on the display.

* * * * *